(12) United States Patent
Bandopadhyay

(10) Patent No.: US 8,521,704 B2
(45) Date of Patent: Aug. 27, 2013

(54) SYSTEM AND METHOD FOR FILESYSTEM DEDUPLICATION USING VARIABLE LENGTH SHARING

(75) Inventor: Tushar Bandopadhyay, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 26 days.

(21) Appl. No.: 13/250,735

(22) Filed: Sep. 30, 2011

(65) Prior Publication Data

US 2013/0086007 A1    Apr. 4, 2013

(51) Int. Cl.
*G06F 7/00* (2006.01)
*G06F 17/00* (2006.01)

(52) U.S. Cl.
USPC .......................................................... 707/692

(58) Field of Classification Search
USPC .......................................... 707/692, 999.101
See application file for complete search history.

(56) References Cited

U.S. PATENT DOCUMENTS

| | | | |
|---|---|---|---|
| 2008/0005141 A1* | 1/2008 | Zheng et al. | 707/101 |
| 2009/0132619 A1* | 5/2009 | Arakawa et al. | 707/205 |

* cited by examiner

*Primary Examiner* — Aleksandr Kerzhner
(74) *Attorney, Agent, or Firm* — Wilmer Cutler Pickering; Hale and Dorr LLP

(57) ABSTRACT

Embodiments of the present invention are directed to a method and system for filesystem deduplication that uses both small fingerprint granularity and variable length sharing techniques. The method includes accessing, within an electronic system, a plurality of files in a primary storage filesystem and determining a plurality of fingerprints for the plurality of files. Each respective fingerprint may correspond to a respective portion of a respective file of the plurality of files. The method further includes determining a plurality of portions of the plurality of files where each of the plurality of portions has the same corresponding fingerprint and accessing a list comprising a plurality of portions of files previously deduplicated. A portion of a file of the plurality of files not present in the list may then be deduplicated. Consecutive portions of variables lengths having the same corresponding fingerprints may also be deduplicated.

20 Claims, 9 Drawing Sheets

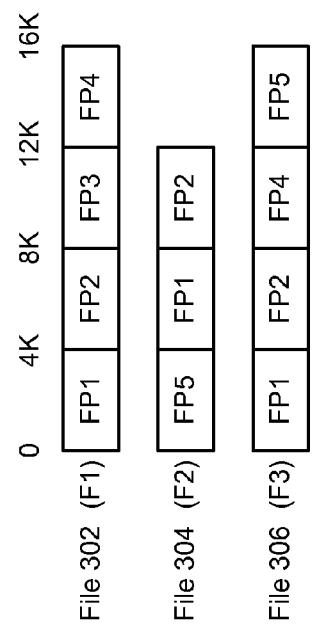

SYSTEM AND METHOD FOR FILESYSTEM DEDUPLICATION USING VARIABLE LENGTH SHARING

FIELD OF THE INVENTION

Embodiments of the present invention are generally related to digital computer systems and digital storage.

BACKGROUND OF THE INVENTION

As technology advances, data storage is becoming increasingly important and data storage capacities are increasing rapidly. Correspondingly, the size of data storage arrays and their demands for storage have increased rapidly. Thus, ever increasing amounts of data are required to be highly available. As a result, conservation of storage space and use of space saving techniques has become particularly important.

In order the save space, deduplication is a way of performing duplicate data detection and elimination in storage. Previous solutions have been in the area of backup deduplication which are not well suited to primary or live storage. Previous attempts to do inline deduplication for filesystem storage, or deduplication before data is written to the disk from an application, have significant performance issues. For example, when an application makes a request to write data, the data must be compared to the data currently stored prior to being written. This penalty results from the need to compare data prior to writing the data. Even if there is not a write operation as a result of the deduplication process, there is still a performance penalty which negatively impacts the application performance. The penalty may be reduced if a large amount of memory is used to prevent having to perform lookups on the storage. However, this is not practical in most systems.

File level deduplication is not feasible for primary storage because the signification resources involved in comparing the files. File level deduplication does not provide acceptable deduplication percentages generally and in particular when files are modified by a single byte.

Thus, a need exists to efficiently deduplicate data of a filesystem on primary storage so that large amounts of RAM memory are not required and the applications do not experience a performance penalty.

SUMMARY OF THE INVENTION

Accordingly, embodiments of the present invention provide a system and method for filesystem deduplication that uses variable length sharing. Embodiments of the present invention are operable to perform periodic deduplication of a primary storage filesystem with significant resource utilization and storage savings. Embodiments are operable to perform variable length sharing or deduplication with small fingerprint granularity thereby deduplicating consecutive portions of files having same content. Variable length sharing further allows embodiments of the present invention to avoid making calls to perform sharing or deduplication operations for portions of a file previously shared as part of a larger share. Embodiments of the present invention are thus operable to perform efficient deduplication and maintain an efficient file geometry (e.g., by deduplicating multiple matching portions of files).

In one embodiment, the present invention is implemented as a method for filesystem deduplication. The method includes accessing, within an electronic system, a plurality of files in a primary storage filesystem and determining a plurality of fingerprints for the plurality of files. In one embodiment, each respective fingerprint has a small fingerprint granularity and corresponds to a respective portion of a respective file of the plurality of files. The method further includes determining a plurality of portions of the plurality of files where each of the plurality of portions has the same corresponding fingerprint and accessing a list comprising a plurality of portions of files previously deduplicated. The list may further include deleted or truncated files. A portion of a file of the plurality of files not present in the list may then be deduplicated. The portion of the file of the plurality of files may then be added the list. The fingerprint corresponding the portion of the file may be verified prior to deduplication. In one embodiment, the deduplicating further comprises setting a metadata pointer for a portion of a file. The deduplicating further comprises deduplicating consecutive portions of variable lengths of the plurality of files having the same corresponding fingerprints in response to a single function call. The consecutive portions of the plurality of files having the same fingerprint may then be added to the list. In one embodiment, the deduplicating is performed by via a kernel.

In another embodiment, the present invention is implemented as a non-transitory computer readable storage medium having stored thereon, computer executable instructions that, if executed by a computer system cause the computer system to perform a method for filesystem deduplication including accessing, within an electronic system, a plurality of files in a primary storage filesystem and determining a plurality of fingerprints for the plurality of files. In one embodiment, each respective fingerprint has a small fingerprint granularity and corresponds to a respective portion of a respective file of the plurality of files. The method further includes determining a plurality of portions of the plurality of files where each of the plurality of portions has the same corresponding fingerprint and accessing a list comprising a plurality of portions of files previously deduplicated. The list may further include deleted or truncated files. A portion of a file of the plurality of files not present in the list may then be deduplicated. The portion of the file of the plurality of files may then be added the list. The fingerprint corresponding the portion of the file may be verified prior to deduplication. In one embodiment, the deduplicating further comprises setting a metadata pointer for a portion of a file. The deduplicating further comprises deduplicating consecutive portions of variable lengths of the plurality of files having the same corresponding fingerprints in response to a single function call. The consecutive portions of the plurality of files having the same fingerprint may then be added to the list. In one embodiment, the deduplicating is performed by via a kernel.

In yet another embodiment, the present invention is implemented as a storage system comprising a computer system having one or more processors coupled to a computer readable storage media and executing computer readable code which causes the computer system to implement a process for filesystem deduplication including accessing, within an electronic system, a plurality of files in a primary storage filesystem and determining a plurality of fingerprints for the plurality of files. In one embodiment, each respective fingerprint has a small fingerprint granularity and corresponds to a respective portion of a respective file of the plurality of files. The method further includes determining a plurality of portions of the plurality of files where each of the plurality of portions has the same corresponding fingerprint and accessing a list comprising a plurality of portions of files previously deduplicated. The list may further include deleted or truncated files. A portion of a file of the plurality of files not present in the list may then be deduplicated. The portion of the file of the plurality of files may then be added the list. The fingerprint corresponding the portion of the file may be verified prior to deduplication. In one embodiment, the deduplicating further comprises setting a metadata pointer for a portion of a file. The deduplicating further comprises deduplicating consecutive portions of variable lengths of the plurality of files having the same corresponding fingerprints in response to a single function call. The consecutive portions of the plurality of files having the same fingerprint may then be added to the list. In one embodiment, the deduplicating is performed by via a kernel.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 3 shows a block diagram of exemplary files and corresponding fingerprints, in accordance with one embodiment of the present invention.

DETAILED DESCRIPTION OF THE INVENTION

Figure 1:
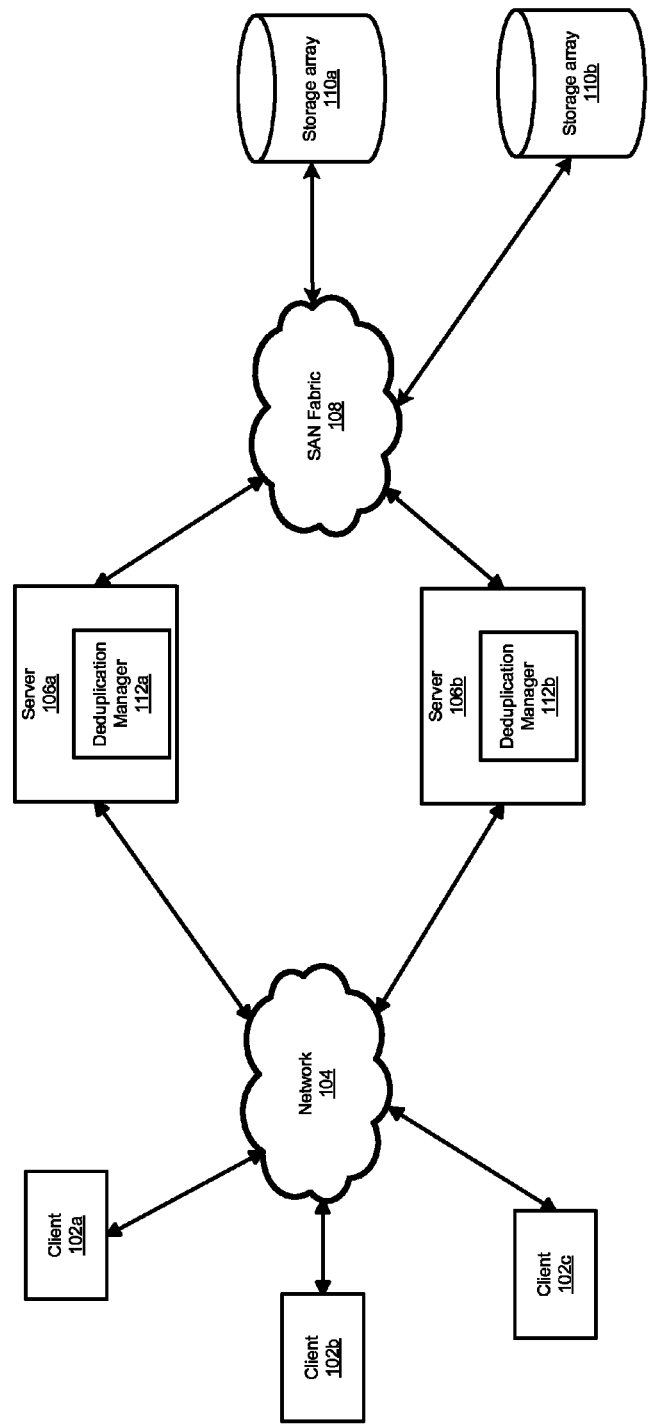
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes clients 102a-c, network 104, servers 106a-b, storage area network (SAN) fabric 108, and storage arrays 110a-b. It is appreciated that the components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). Servers 106a-b perform requests received from clients 102a-c. FIG. 1 depicts the use of network 104 such as the Internet for exchanging data, but the present disclosure is not limited to the Internet or any particular network-based environment.

Servers 106a-b can have multiple clients (e.g., clients 102a-c) connected thereto. Servers 106a-b can provide access to data for various types of applications including, but not limited to, database servers, network file system (NFS) servers, and application servers (e.g., billing). For example, applications and servers might have thousands of people accessing them from different locations, thus the applications and servers need to be highly available and the cluster fault tolerant. Servers 106a-b may be linked to storage arrays 110a-b in a variety of ways including, fibre channel.

Server 106a-b executes deduplication managers 112a-b which perform periodic deduplication of data of in storage array 110a-b. Deduplication managers 112a-b communicate with storage arrays 110a-b via SAN fabric 108. Deduplication managers 112a-b optimize deduplication by performing variable length sharing and skipping redundant deduplication function calls.

Exemplary Systems and Methods for Filesystem Deduplication Using Variable Length Sharing Embodiments of the present invention provide filesystem deduplication advantageously using variable length sharing with small fingerprint granularity. Embodiments of the present invention further provide efficient file geometries via variable length sharing.

Deduplication is the process of reducing storage needs by identifying and eliminating redundant data within the files. In other words, deduplication is a method of data compression by eliminating redundant copies of data. Primary storage or filesystem deduplication can be achieved by inline, near-line, and periodic methods. Inline deduplication identifies redundant data before writing to storage medium. For inline deduplication, eliminating duplicate data can be done by not writing any duplicate data to the disk and within the file definition pointing to the existing copy of the data. Embodiments of the present invention facilitate filesystem deduplication to increase storage utilization, reduce data that is sent over network connections (e.g., wide area network (WAN)) for replication and data recovery, and to provide efficient use of disk space for higher retention periods.

Sharing, as described herein, means that if two blocks or two portions of different files are identical, one block is freed and the portion that corresponds to the freed block is pointed to in the other file. In other words, sharing may include changing the metadata of a file to point to one copy of data. Embodiments of the present invention support recording a reference count for each block, such that if a file containing a shared block is deleted, the shared block is not deleted and thereby available for access as part of a file with a pointer to the shared block.

Embodiments of the present invention are operable to uniquely identify data, identify duplicate data, and eliminate duplicate data within a filesystem. With periodic duplication, redundant data is detected and eliminated after it has been written to the storage medium. Further, periodic deduplication performed by embodiments of the present invention may be scheduled during a lower load time of the filesystem (e.g., at night or during low load/idle). Identification, duplicate retention, and sharing can thus be scheduled. Verification may be performed during block sharing due to the time between fingerprinting and duplicate elimination because the file remains live. In one embodiment, during periodic deduplication a duplicate data advisory may be evaluated for correctness (e.g., verified) and if valid, data is replaced by a pointer to an existing data chunk while a newly written data chunk is freed. In one embodiment, blocks are shared within a filesystem boundary. It is appreciated the periodic deduplication can handle deletes and truncates more efficiently than deduplication.

In one embodiment, files are detected periodically, fingerprinted, and mapping of fingerprints is stored. Duplicate detection may be done out of band thereby making the memory requirement negligible as compared to inline deduplication.

It is appreciated that embodiments of the present invention support variable size matching. It is noted that variable size matches with inline deduplication is extremely difficult due to the memory requirements and performance impact. Embodiments of the present invention are operable to perform variable size matches based on achieving larger block sharing granularity than the granularity of the fingerprinting which is small in accordance with embodiments of the present invention.

Filesystem deduplication can be performed at the file level and the sub-file level. With sub-file level deduplication, a file is broken into several units and each unit is independently evaluated for possible duplicates in the entire filesystem. Sub-file level deduplication can thus significantly increase the rate of deduplication. It is appreciated that sub-file level deduplication may involve more sophisticated duplicate detection and maintenance.

The size of each unit to which the file is broken into is an important factor in sub-file level deduplication. It is appreciated that the smaller the size, the greater the possibility of finding duplicates and more storage can be saved. However, this results in an increase in the number of operations to address the data per file in the filesystem, which may negatively impact performance. In one embodiment, 90% of space optimizations are achieved when the granularity of the sub-file unit used for fingerprint is in the 4K, 8K, 16K, and 32K range.

Embodiments are operable to separate out the sub-file unit size and the actual share or deduplication size, thereby maintaining an aggressive match prospect by having a small sub-file unit size while encouraging large matches in the filesystem. Embodiments of the present invention thus do not compromise on the maximum sharing or space saving that can be achieved.

In one embodiment, the sub-file unit used for filesystem deduplication is 4K (or the filesystem block size if larger than 4K) with the possibility of a higher sub-file unit size in multiples of the filesystem block size. Of course, this value is exemplary. Sub-file mapping of data blocks may be represented by a quadruple of data, inode number, logical offset, and size.

In one embodiment, the deduplication process can be administered with a plurality of components including a deduplication administration daemon, deduplication administration command line interface (CLI), command line interface shell (CLISH), and a user interface. The deduplication administration daemon is operable to maintain configuration (e.g., configuration 206), schedule, and perform management for each filesystem in a cluster for deduplication. The deduplication administration CLI is operable to interact with the deduplication administration daemon to query, schedule, start and stop deduplication tasks for a filesystem. The CLISH is operable to function as a fileStore console interface that interacts with the deduplication administration CLI. The user interface is operable to function as a Volume Manager (VOM)/FileStore user interface that interacts with the deduplication administration CLI.

Figure 2A:
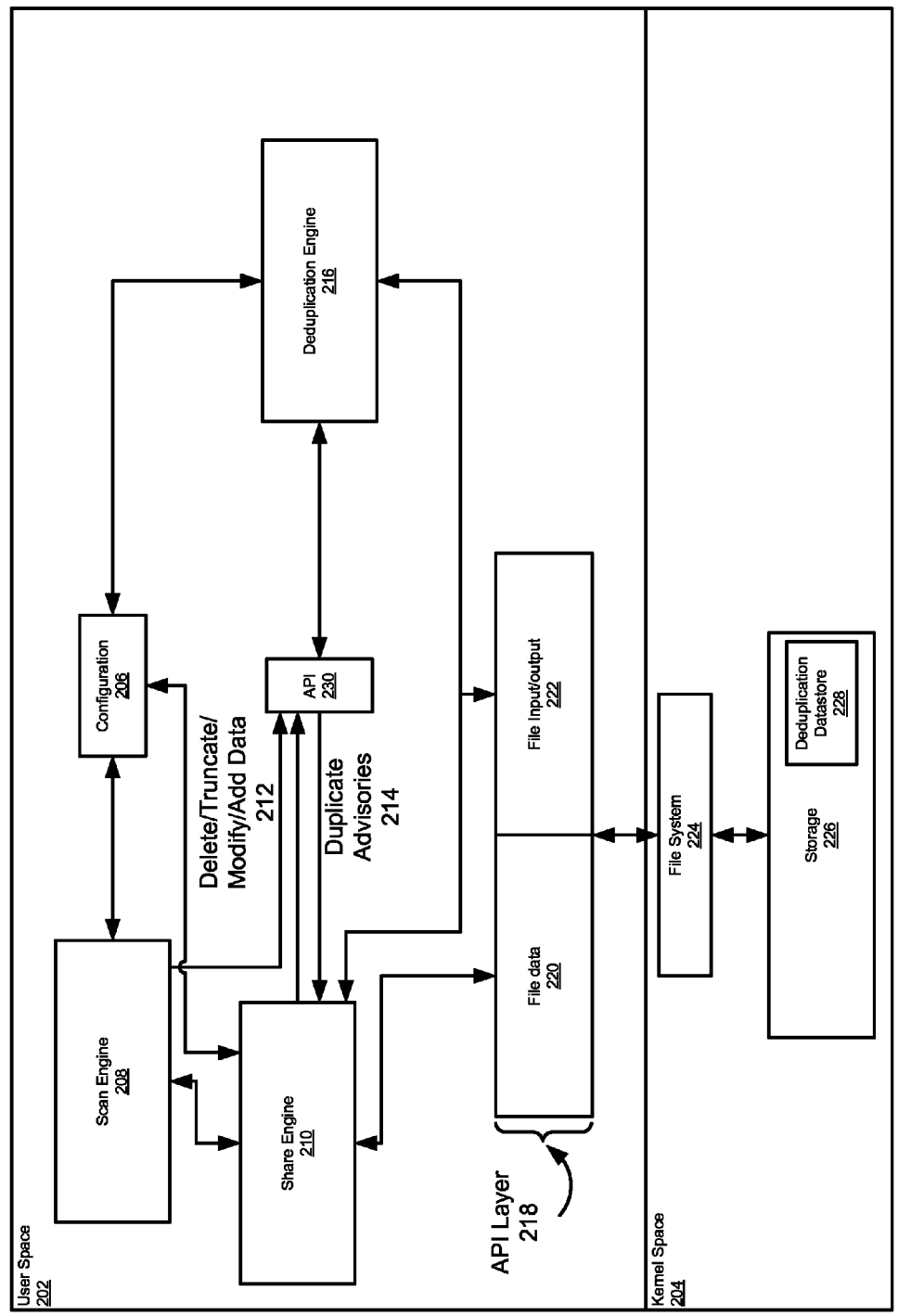
FIG. 2A shows a block diagram of an exemplary dataflow during deduplication, in accordance with one embodiment of the present invention.

FIG. 2A shows a block diagram of an exemplary dataflow during deduplication, in accordance with one embodiment of the present invention. Dataflow diagram 200 includes user space 202 and kernel space 204. Scan engine 208, share engine 210, deduplication engine 216, and application programming interface (API) 210, and API layer 218 execute in user space. Filesystem 224 executes in kernel space and storage 226 is part of kernel space 204. Scan engine 208 and share engine 210 interface with the deduplication engine 216 and the filesystem 224 (e.g., via API layer 218).

API layer 218 comprises file data 220 and file input/output (I/O) 222. File data 220 may comprise a file change log(FCL) for tracking changes to files and checkpoints for a filesystem (e.g., filesystem 224). File I/O 222 portion of API layer 218 comprises functions for performing I/O operations via filesystem 224.

Filesystem 224 performs functions for accessing and managing data in storage 226. It is appreciated that in one embodiment, filesystem 224 is a primary or live storage filesystem actively being used to support applications. Storage 226 includes deduplication datastore 228 for storing data for use in deduplication by embodiments of the present invention. Configuration 206 includes settings for periodic deduplication performed by embodiments of the present invention including a predetermined schedule for deduplication and system load settings for deduplication. Configuration 206 may be accessed by scan engine 208, share engine 210, and by deduplication engine 216.

Scan Engine 208 is operable to uniquely identify data which serves as a basis for deduplication. In one embodiment, scan engine 208 determines fingerprints based on scanning the data on storage 226. In one embodiment, fingerprinting using a cryptographic hashing algorithm is used to create a unique signature for a given input. It is appreciated that embodiments of the present invention may use other methods to uniquely identify data. Each portion of data resulting in a given fingerprint (e.g., fingerprint FP) for a given size of data (e.g., size S) are duplicates of each other. Files may be scanned and fingerprinted at a small fingerprint granularity (e.g., 4K or the filesystem block size in accordance with embodiments of the present invention). Scan engine 208 may report on possibility of space savings-pre-deduplication and report on the space saving for a deduplicated filesystem.

In one embodiment, the location of a portion of a file is represented with respect to the file identifier (ID) and the data is represented by a fingerprint. Each fingerprint may be mapped or correspond to an <inode, offset> pair. Each <inode, offset> pair for a single fingerprint may be arranged in a group, known as a duplicate group. A database may be used to map a data location to the corresponding fingerprint and the size. It is appreciated that with inline deduplication, the data identification or fingerprinting is done in the input/output (I/O) write path. With periodic deduplication, the storage media is scanned during periods of system inactivity, such as at night, for changes to achieve data identification.

Verification of actual data may be performed before a share/elimination is done for periodic deduplication using an algorithm (e.g., fingerprint) that is sufficiently strong. Scan engine 208 is further operable to identify new or changed data. Scan engine 208 tracks and determines the data that is present, changed, and added to the filesystem. Scan engine 208 may perform a full scan of the filesystem for the initial run, and/or perform incremental detection, for changes including deletes, truncates, modifications, and additions to the filesystem. In one embodiment, scan engine 208 scans the filesystem for changes and submits the changes (e.g., deletes/truncates/modification/adds 214 via API 230) to the deduplication engine 216.

In one embodiment, scan engine 208 interfaces with deduplication engine 216 or duplicate identification component to generate the mapping of data and its location. For each filesystem, scan engine 208 may use one or each of the following configuration parameters (e.g., from configuration 206) for a filesystem: list of directories, type of files, frequency, and age of files.

In one embodiment, scan engine 208 uses parallel processing for scanning the filesystem using a thread pool. Each thread in the pool may use its own connection to deduplication engine 216. After the filesystem has been scanned and the data is mapped (e.g., fingerprinted), each connection to deduplication engine 216 may be closed. A new connection may then be opened to deduplication engine 216 and based on a schedule (e.g., periodic deduplication schedule based on machine load) duplicates may be identified or share engine 210 may be initialized. During identification of duplicates, deduplication engine 216 may be signaled to process the data submitted thus far and identify the duplicates. The duplicate detection may be done asynchronously and calls to deduplication engine 216 may return immediately. In one embodiment, a ProcessDuplicates function is invoked in deduplication engine 216 in asynchronous mode. When share engine 210 is invoked, share engine 210 may control requesting and processing of matches as is described further below.

Scan engine 208 may then stop deduplication engine 216 and the checkpoint that was previously created and mounted is un-mounted and converted to a "no data" checkpoint. This is due to the fact that the checkpoint does not need to provide data in the future and a "no data" checkpoint minimizes the impact on the filesystem. This checkpoint may then be used in future incremental deduplication as a time reference as well as to detect the block level changes to the files.

Deduplication engine 216 is operable for processing of duplicates, perform duplicate detection, and maintain a database. Deduplication engine 216 operates on the data created and periodically updated by scan engine 208 (e.g., fingerprinted) to determine or build advisory sets of duplicate data in the filesystem. In one embodiment, deduplication engine 216 processes the fingerprints and determines if a fingerprint is present in more than one file or more than one place in the same file. Each advisory set may comprise for each fingerprint known existing data along with its location and identical new data and its location. Deduplication engine 216 may maintain a log of submissions and on request from share engine 210 processes and delivers duplicate block advisory sets 214 (e.g., via API 230).

In one embodiment, deduplication engine 216 may support a set of APIs (e.g., API 230) for optimized filesystem activities comprising fingerprinting of data, processing inodes (e.g., instead of filenames), purging based on deleted and truncated files, on-demand processing for duplicate detection, efficient delivery of duplicate of advisory sets, and delivering statistics for analysis. Embodiments of the present invention may support asynchronous processing of fingerprints and determination of duplicates.

Sharing engine 210 is operable to perform deduplication based on the advisory sets generated by deduplication engine 216. In one embodiment, the share engine 210 determines whether the data needed to be shared (e.g., deduplicated) or has already been deduplicated or shared. Share engine 210 is operable to keep track of regions or portions of files that have been previously deduplicated. If the data has not been shared, share engine 210 instructs filesystem 224 to share or eliminate the new data and point to or reference existing data.

In one embodiment, the share engine 210 processes the advisory sets and may post duplicate block advisories to filesystem 224 which verifies the blocks in the advisory and either eliminates duplicate blocks or rejects the advisory. In one embodiment, the share engine 210 processes the result from the filesystem (e.g., the size of the match or the number of matched portions) before proceeding to process the next duplicate advisory.

Share engine 210 may control sharing by writing pointers, freeing up storage, and determining whether to make a call to the kernel to perform deduplication. Share engine 210 processes fingerprints which have more than one metadata entry associated with the fingerprint, reflecting there is a potential duplicate case. In one embodiment, upon finding a match, share engine 210 calls the kernel to do the matching or deduplication. Embodiments of the present invention employ variable length sharing, therefore the kernel will determine and respond with a match size. The match size may be larger than the fingerprint granularity and thereby indicating that the consecutive portions of the files match. Share engine 210 is operable to determine a range based on the match size. Subsequent locations corresponding to the fingerprints within the range may then be are then excluded from deduplication.

In one embodiment, share engine 210 may be initiated for synchronous duplicate detection from deduplication engine 216. Share engine 210 may then request the duplicate advisory sets. The advisory sets may be received in the following exemplary form: <fingerprint> <list of known data locations> <list of new data locations> <size>.

The requests for duplicate advisory sets may be repeated for as many fingerprints as were updated or added in the latest deduplicate detection. Share engine 210 may then select a data location (e.g., inode and logical offset) from the list of known data locations. Then for each corresponding data location from the list of new data locations, a deduplicate function may be invoked (e.g., via an API) for block sharing for the corresponding size.

In one embodiment, using variable length sharing, the deduplicate function can make a match more than the requested size and honor directionality, share engine 210 may thus facilitate a large match without comprising the quantity of matches. In doing so, share engine 210 will eliminate a significant amount of calls to the deduplicate function itself thereby increasing the speed of the block sharing process. In one embodiment, the ratio of the number of duplicate blocks to the number of deduplicate function calls is approximately the deduplication ratio for the data set.

In one embodiment, the following scheme may be used: a single data location is not repeated in the advisory sets and once a data location has been marked shared, the data location is not shared elsewhere. It is noted that before the sharing is started, multiple islands of shared data for same fingerprint may exist.

In one embodiment, an exclusion list and an elimination list may be used. The exclusion list and the elimination list may each contain inodes and offset ranges. When a call is made to share a block (e.g., <f1, Offset0> to <f2, offset0>), the first pair is designated as the primary pair. An adaptive evaluation is made so that, if possible, a larger share is created by comparing additional data (e.g., consecutive portions of two files). For example, a single call may share all the blocks of both of the files. When a share occurs greater than the fingerprint granularity, two exclusion list entries are added, one for each file. When the next call for f1 and f2 in the range of the share, the pairs are sorted based on their availability on the exclusion list. If the pair exists in the exclusion list, that pair is deemed suitable for becoming the primary pair. If each pair is in the exclusion list, the duplicate group is skipped. Thus, one call may be to perform verification and one call may be performed to do the sharing.

In one embodiment, if a variable length sharing operation returns a size greater than the fingerprint granularity then any requests for sharing or deduplication within the match size or range will be excluded from being sent further. For example, if the first 10K of two files are determined to match via variable length sharing operation then requests to match portions of the files from 0K to 10K are excluded from being sent further after the first variable length sharing operation is performed. It is appreciated that conventional approaches involve matching only a single granularity unit or block and thus do not perform variable length sharing.

In one embodiment, deleted and truncated files are put in an elimination list which is used to exclude files from the deduplication process. It is noted that embodiments may be able to achieve 1:10 to 1:40 reduction in the number of calls to share or deduplicate.

Scan engine 208 and share engine 210 may be operable to operate in three modes comprising: full deduplication mode, incremental deduplication mode, and dry run deduplication mode. In one embodiment, the scan engine 208 and share engine 210 may reside in a single executable which may be invoked per filesystem in one of the modes supported by the filesystem.

Full deduplication mode comprises scanning the entire filesystem and performing an end-to-end deduplication including duplicate detection and elimination of duplicates. Incremental deduplication mode comprises detecting the delta changes in the filesystem (e.g., changed files), purging/updating the duplicate information, and performing duplicate elimination. This mode may be performed when a prior and relevant full deduplication is detected.

During full deduplication mode, scan engine 208 may perform a complete tree walk of the entire filesystem. In one embodiment, any residue of previous scans (e.g., deduplication database, snapshots, and file change log markers) may be discarded. Full deduplication mode may begin with enabling the file change log(FCL) on the filesystem and creating a named checkpoint on the filesystem. For example, a checkpoint "prev_ckpt" may be created and mounted on a directory for filesystem. Deduplication engine 216 may then be configured and initialized for the filesystem. The files of the filesystem may then be read in blocks (e.g., 4K or the block size of the filesystem). Scan engine 208 can then send data, location, and size for each block to deduplication engine 216 (e.g., using a deduplication engine API). In one embodiment, scan engine 208 makes a call of the format: AddBlock (<data>, inode, offset, size) to deduplication engine 216. In one embodiment, if the data scanned and time taken in sufficiently large, full deduplication mode may initiate an incremental deduplication mode to consolidate the changes that have happened during the course of full deduplication mode.

Dry run deduplication mode comprises scanning the entire filesystem and reporting on possible space savings by identifying duplicate data. The determinations made during dry run deduplication mode may be used to perform full deduplication.

In one embodiment, dry run deduplication mode may have several differences from full deduplication mode. During dry run deduplication mode, any checkpoint or deduplication database may be saved before proceeding. Upon scan completion, duplicate processing may be requested synchronously. If there was nothing to save at the beginning of the dry run or at the end of the dry run, an option may be presented to convert from dry run deduplication mode to full deduplication mode. Alternatively, the checkpoint and deduplication database may be discarded at the end of the dry run deduplication mode. If state information (e.g., checkpoint or deduplication database) was previously saved, it may be restored.

Dry run deduplication mode may rely on statistics generated from duplicate processing to report a space saving percentage that could be achieved if the filesystem is deduplicated. The percentage may be suggested by calculating the number of potential blocks that can be freed. In one embodiment, the deduplication database may reside in the filesystem itself and may consume a small percent of storage.

During dry run deduplication mode, the amount of actual space savings for a deduplicated filesystem may also be presented. It is noted that this would indicate how much space one would need if deduplication was undone on the filesystem (e.g., re-hydrated).

In one embodiment, scan engine 208 and share engine 210 use regular and "no data" checkpoints to detect changes in a filesystem along with a filesystem file change log (FCL). For block sharing, the scan engine 208 and share engine 210 may use ioctl (input/output control) calls to initiate sharing. The ioctl calls may support verifying and sharing a pair of blocks (e.g. verification may include detecting if the two pairs already point to the same physical block), directional sharing (e.g., honor the request on the basis of "primary block" and "duplicate block"), honoring the minimum size requests, and attempting longer shares if feasible (e.g., limited by the boundaries consecutive matching portions and maximum match size) and return size actually shared.

In one embodiment, share engine 210 is operable to handle a plurality of errors. When a new data inode error occurs, the share engine adds the inode to the new data exclusion list. When there is a new data offset error, the share engine adds the current offset and infinite range to new data exclusion list. When there is a known data inode error, the share engine adds the inode to the known data exclusion list. When the known data offset error occurs, the share engine adds the current offset and an infinite range to the known data exclusion list.

Figure 2B:
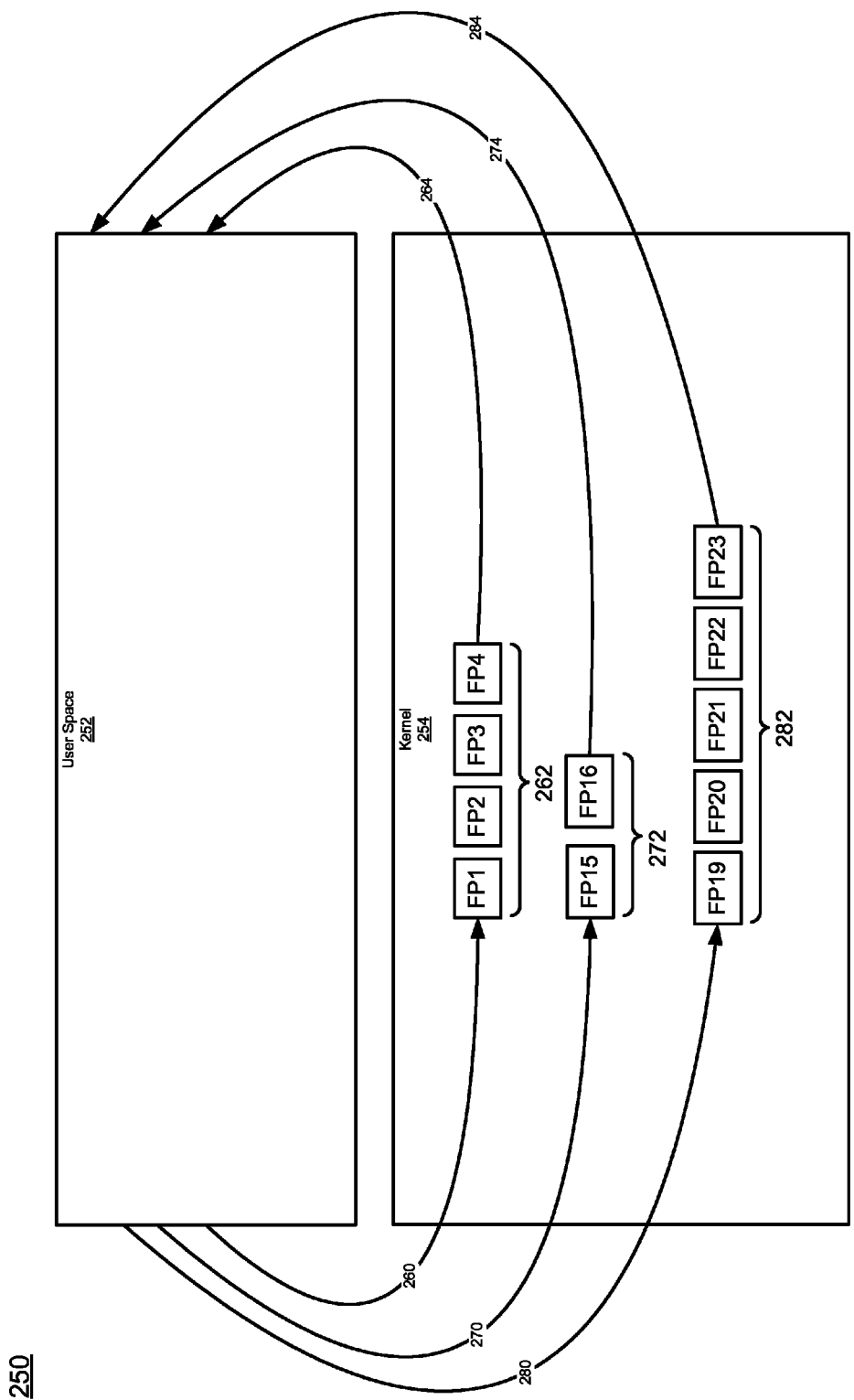
FIG. 2B shows a block diagram of exemplary variable length sharing, in accordance with one embodiment of the present invention.

FIG. 2B shows a block diagram of exemplary variable length sharing, in accordance with one embodiment of the present invention. Diagram 250 includes user space 252 and kernel 254. Calls 260, 270, and 280 are made from user space 252 (e.g., by a user space application, such as share engine 210). In one embodiment, kernel 254 performs variable length sharing based on calls 260, 270, and 280 and returns results 264, 274, and 284. As depicted, embodiments of the present invention comprise a kernel operable to perform variable length sharing based on a single call to the kernel.

Call 260 originates from user space 252 and may include a request to deduplicate portions of two files having corresponding fingerprint FP1. In response to call 260, kernel 254 performs sharing based on fingerprint FP1. Kernel 254 further determines a largest possible match comprising fingerprints FP1, FP2, FP3, and FP4. Files having consecutive portions corresponding to fingerprints FP1, FP2, FP3, and FP4 are then deduplicated. Kernel 254 returns result 264 which includes the match size of four along with the corresponding fingerprints FP1, FP2, FP3, and FP4.

Call 270 originates from user space 252 and may include a request to deduplicate portions of two files having corresponding fingerprint FP15. In response to call 270, kernel 254 performs sharing based on fingerprint FP15. Kernel 254 further determines a largest possible match comprising fingerprints FP15 and FP16. Files having consecutive portions corresponding to fingerprints FP15 and FP16 are then deduplicated. Kernel 254 returns result 274 which includes the match size of two along with the corresponding fingerprints FP15 and FP16.

Call 280 originates from user space 252 and may include a request to deduplicate portions of two files having corresponding fingerprint FP19. In response to call 280, kernel 254 performs sharing based on fingerprint FP19. Kernel 254 further determines a largest possible match comprising fingerprints FP19, FP20, FP21, FP22, and FP23. Files having consecutive portions corresponding to fingerprints FP19, FP20, FP21, FP22, and FP23 are then deduplicated. Kernel 254 returns result 284 which includes the match size of five along with the corresponding fingerprints FP19, FP20, FP21, FP22, and FP23.

FIG. 3 shows a block diagram of exemplary files and corresponding fingerprints, in accordance with one embodiment of the present invention. In one embodiment, the fingerprints were determined by scan engine 208. Diagram 300 shows an exemplary representation of three files 302-304 (F1-F3) with corresponding fingerprints for each 4K block. Fingerprint granularity is 4K. It is appreciated that embodiments of the present invention support blocks or portions of files of any size. FIG. 3 depicts portions of files 302-306 having consecutive corresponding fingerprints (e.g., FP1 and FP2) that embodiments are operable to deduplicate based on variable length sharing.

Fingerprint FP1 corresponds to the 0 to 4K portion of file 302, fingerprint FP2 corresponds to the 4K to 8K portion, fingerprint FP3 corresponds to the 8K to 12K portion, and fingerprint FP4 corresponds to the 12K to 16K portion of file 302. Fingerprint FP5 corresponds to the 0 to 4K portion of file 304, fingerprint FP4 corresponds to 4K to 8K portion, and fingerprint FP2 corresponds to the 8K to 12K portion of file 304. FP1 corresponds to the 0 to 4K portion of file 306, fingerprint FP2 corresponds to the 4K to 8K portion, FP4 corresponds to the 8K to 12K portion, fingerprint FP5 corresponds to the 12K to 16K of file 306.

Table I shows an exemplary deduplication database and advisories for files 302-306 scanned and submitted in the order of file 302 (F1), 304 (F2), and 306 (F3) at times t1, t2, and t3 respectively, in accordance with an embodiment of the present invention.

TABLE I

Exemplary Deduplication Database and Duplicates Advisories, where F1 corresponds to file 302, F2 corresponds to file 304. and F3 corresponds to file

| | Time t1 | Time t2 | Time t3 |
|---|---|---|---|
| Deduplication Database | FP1 → F1, 0, 4K<br>FP2 → F1, 4K, 4K<br>FP3 → F1, 8K, 4K<br>FP4 → F1, 12K, 4K | FP1 → F2, 4K, 4K<br>FP1 → F1, 0, 4K<br>FP2 → F2, 8K, 4K<br>FP2 → F1, 4K, 4K<br>FP3 → F1, 8K, 4K<br>FP4 → F1, 12K, 4K<br>FP5 → F2, 0, 4K | FP1 → F3, 0, 4K<br>FP1 → F2, 4K, 4K<br>FP1 → F1, 0, 4K<br>FP2 → F3, 4K, 4K<br>FP2 → F1, 4K, 4K<br>FP2 → F2, 8K, 4K<br>FP3 → F1, 8K, 4K<br>FP4 → F3, 12K, 4K<br>FP4 → F1, 12K, 4K<br>FP5 → F3, 8K, 4K<br>FP5 → F2, 0, 4K |
| Duplicates Advisories | None | 1: FP1, <F1, 0>, <F2, 4K>, 4K<br>2: FP2, <F1, 4K>, <F2, 8K), 4K | 1: FP1, <F1, 0>, F3, 0>, 4K<br>2: FP3, <F1, 4K>, <F3, 4K>, 4K<br>3: FP4, <F1, 12k>, <F3, 8K>, 4K<br>4: FP5, <F2, 0>, <F3, 12K>, 4K |

At time t1, file 302 is scanned by scan engine 208 and submitted to deduplication engine 216. As shown in Table I and FIG. 3, in file 302 fingerprint FP1 is determined for the block 0 to 4K, fingerprint FP2 is determined for the block 4K to 8K, fingerprint FP3 is determined for the block 8K to 12K, and the fingerprint FP4 is determined for the block 12K to 16K. For file 304 fingerprint FP5 is determined for the block 0 to 4K, fingerprint FP1 is determined for the block 4K to 8K, and fingerprint FP2 is determined for the block 8K to 12K. For file 306 fingerprint FP1 is determined for the block 0 to 4K, fingerprint FP2 is determined for the block 4K to 8K, fingerprint FP4 is determined for the block 8K to 12K, and fingerprint FP5 is determined for the block 12K to 16K. As shown in Table I, no duplicate advisories are determined based on file 302 because this is the first file submitted and scanned by the scan and share engine and deduplication engine.

At time t2, file 304 is scanned by scan engine 208 and submitted to deduplication engine 216. As shown in Table I, two duplicate advisories are determined comprising a match of fingerprint FP1 in file 302 starting at 0 and in file 304 starting at 4K, and a match of fingerprint FP2 in file 302 starting at 4K and file 304 starting at 8K, each of size 4K.

At time t3, file 306 is scanned by scan engine 208 and submitted to deduplication engine 216. Four duplicate advisories are determined comprising matches of fingerprint FP1 in file 302 starting at 0 and in file 306 starting at 0, fingerprint FP2 in file 302 starting at 4K and in file 306 starting at 4K, fingerprint FP4 in file 302 starting at 12K, and file 306 starting at 8K, and fingerprint FP5 in file 304 starting at 0 and file 306 starting at 12 k, each with a size of 4K. Thus, the duplicate advisories generated indicate each of the duplicate blocks or portions among files 302-306.

Figure 4:
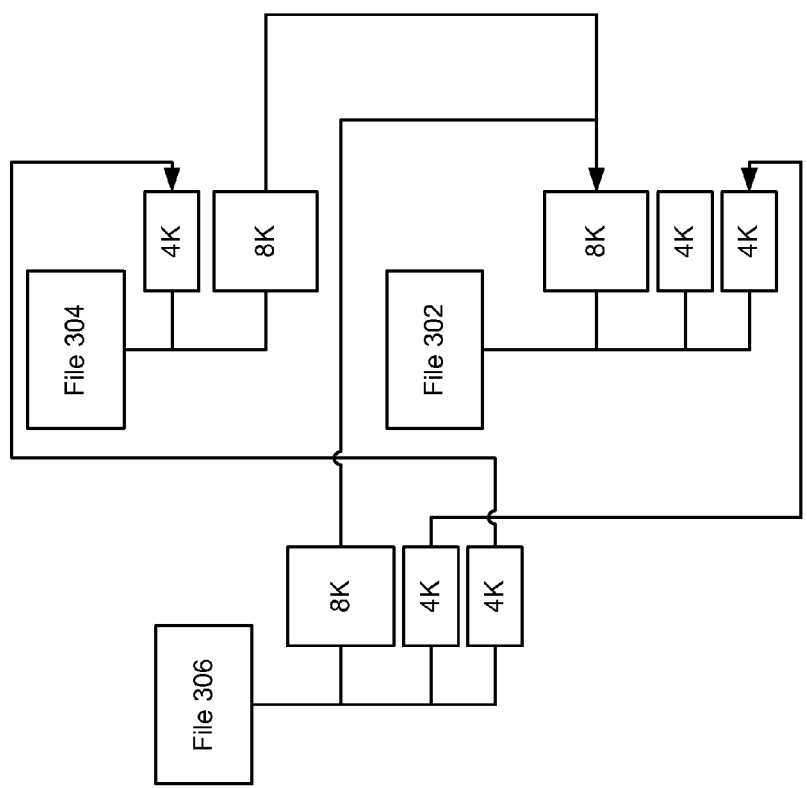
FIG. 4 shows a block diagram of exemplary file geometry of deduplicated files, in accordance with one embodiment of the present invention.

FIG. 4 shows a block diagram of exemplary file geometry of deduplicated files, in accordance with an embodiment of the present invention. FIG. 4 illustrates an exemplary file geometry of files 302-306 after deduplication by embodiments of the present invention. FIG. 4 depicts portions of files 302-306 having been shared or deduplicated, based on variable length sharing, that are larger than the fingerprint granularity. For example, the 8K portion starting at 4K of file 304 and the 8K portion starting at 0K of file 306 points to the 8K portion starting at 0K of file 302.

Table II shows an exemplary representation of a filesystem layout, advisories, and freed blocks (e.g., by share engine 210) for files 302-306 scanned and submitted in the order of file 302, 304, and 306 at times t1, t2, and t3 respectively, in accordance with an embodiment of the present invention.

TABLE II

Exemplary Filesystem Layout During Sharing

| | Time t1 | Time t2 | Time t3 |
|---|---|---|---|
| Filesystem | F1: EX1 (0, 16K)<br>F2: EX1 (0, 12K)<br>F3: EX1 (0, 16K) | F1: EX1 (0, 8K)<br>F1: EX2 (8K, 8K)<br>F2: EX1 (0, 4K)<br>F2: EX2 (4K, 8K) => F1: EX1<br>F3: EX1 (0, 16K) | F1: EX1 (0, 8K)<br>F1: EX2 (8K, 4K)<br>F1: EX3 (12K, 4K)<br>F2: EX1 (0, 4K)<br>F2: EX2 (4K, 8K) => F1: EX1<br>F3: EX1 (0, 8K) => F1: EX1 =><br>F2: EX2<br>F3: EX2 (8K, 4K) => F1: EX2<br>F3: EX3 (12K, 4K) => F2: EX1 |
| RCT ( ) | None | 1: F1: EX1/F2: EX2 Count = 2 | 1: F1: EX1/F2: EX2 Count = 3<br>2: F3: EX2/F1: EX2 Count = 2<br>3: F3: EX3/F2: EX1 Count = 2 |
| Freed Blocks | | Blocks 2 and 3 for F2 | Blocks 1, 2, 3, and 4 for F3 |

Table III shows an exemplary duplicate advisory based on files 302-306, in accordance with an embodiment of the present invention.

TABLE III

Exemplary Duplicate Advisory
Duplicate Advisory

1: FP1, <F1, 0>, <F3, 0>, 4K
2: FP2, <F1, 4K>, <F3, 4K>, 4K
3: FP4, <F1, 12K>, <F3, 8K>, 4K
4: FP5, <F2, 0>, <F3, 12K >, 4K

In one embodiment, the exemplary duplicate advisory is processed as follows: the advisory for a match of file 302 from 0 to 4K is a duplicate of file 306 from 0 to 4K (e.g., <F1,0>, <F3,0>, 4K) and the filesystem report that there is an 8K match (e.g., FP1 and FP2 consecutively match for files 302 and 306). The scan engine then skips the portion of file 306 from 4K to 8K as it has been previously matched and/or are stored in an exclusion list (e.g., skips the call for <F3, 4K>). The advisory for a match of file 302 from 12K to 16K is a duplicate of file 306 from 8K to 12K (e.g., <F1, 12K>, <F3, 8K>, 4K). Then the filesystem reports that there is a 4K match. The advisory for duplicate for file 304 from 0 to 4K is a duplicate of file 306 from 12K to 16K. Then the filesystem advises that there is a 4K match.

Referring to FIG. 4, files 302-306 are shown after deduplication performed by embodiments of the present invention.

File 302 has an 8K sized portion of data starting at 0K, a 4K sized portion starting at 8K, and a 4K portion starting at 12K.

File 304 has a 4K sized portion with data stored at the location from 0 to 4K. The metadata for file 304 comprises pointers such that the 8K sized portion from 4K to 12K points to the 0K to 8K portion of file 302.

The metadata for file 306 comprises pointers such that the 8K sized portion from 0 to 8K points to the 0 to 8K portion of file 302, the 4K sized portion from 8K to 12K of file 306 points to the 12K to 16K portion of file 302, and the 4K sized portion from 12K to 16K portion of file 306 points to the 0 to 4K portion of file 304. It is noted that the use of pointers for the files allows space saving of duplicate portions of the files of variable length. Embodiments of the present invention thus increase performance because the amount of metadata used for a file is reduced for larger portions of files that are the same (e.g., 8K portions of files 304 and 306).

Figure 5:
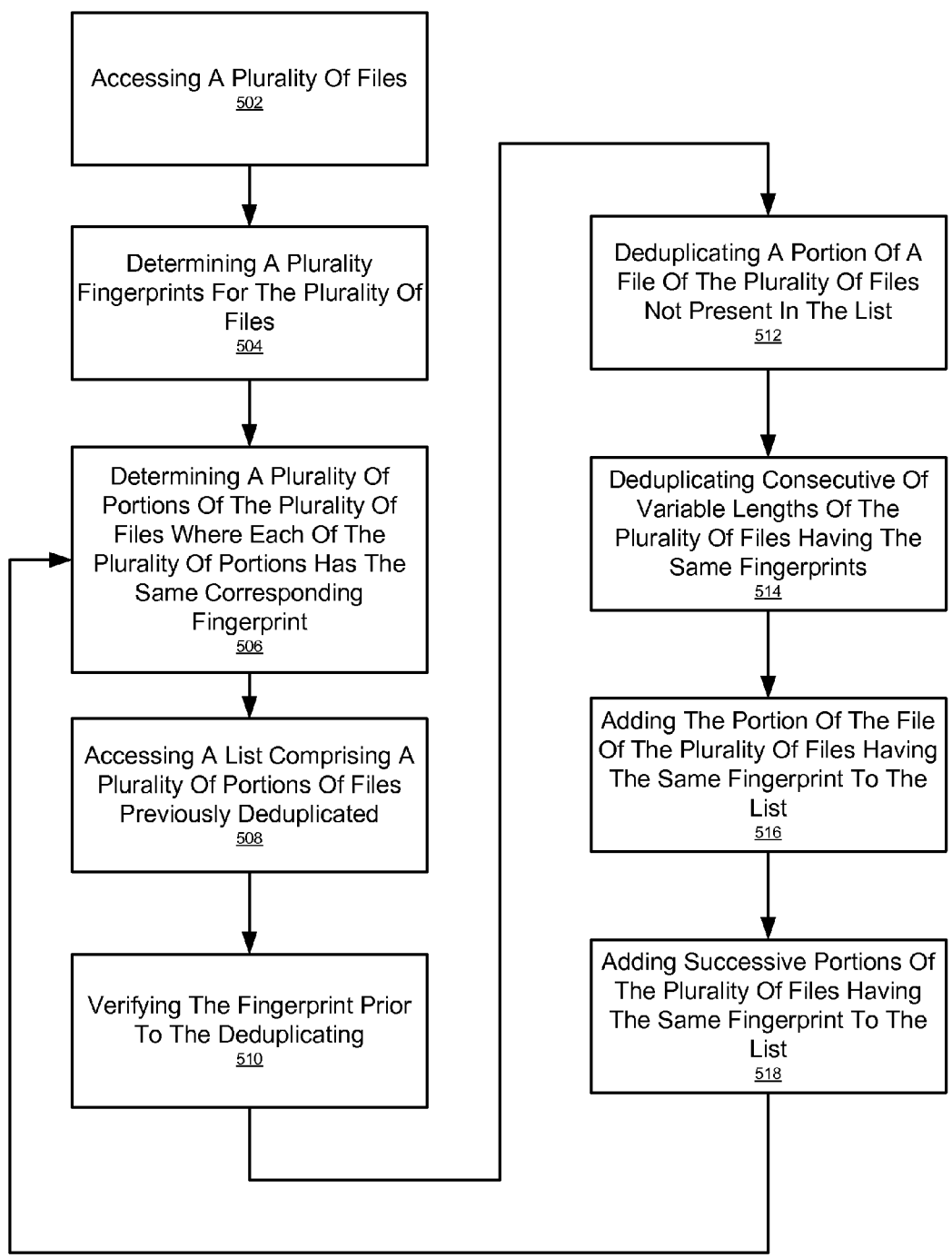
FIG. 5 shows an exemplary flowchart of a computer controlled process for performing deduplication, in accordance with one embodiment of the present invention.
Figure 6:
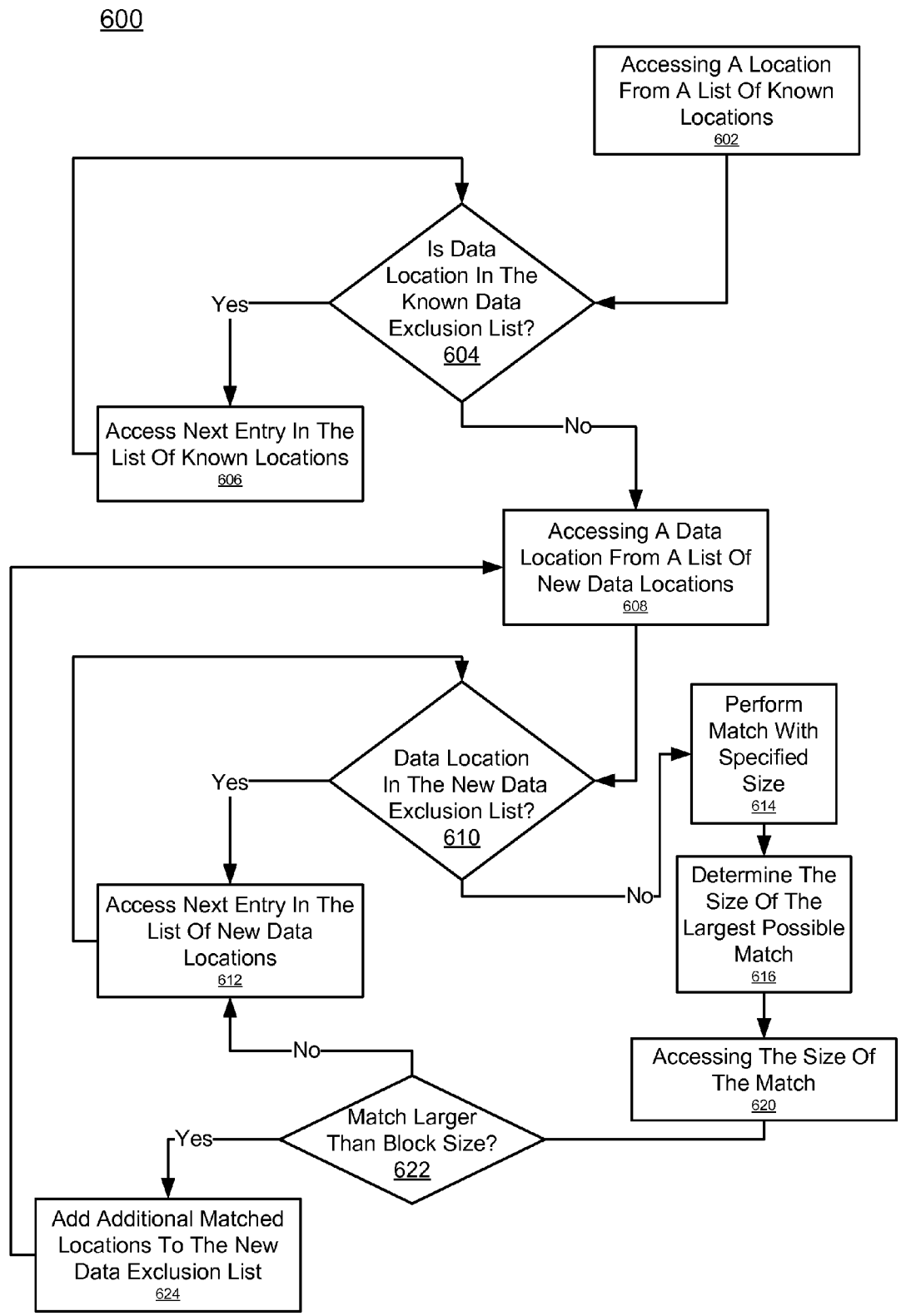
FIG. 6 shows an exemplary flowchart of a computer controlled process for process for sharing or deduplication, in accordance with one embodiment of the present invention.

With reference to FIGS. 5-6, exemplary flowcharts 500-600 illustrates example computer controlled processes used by various embodiments of the present invention. Although specific blocks are disclosed in flowcharts 500-600, such blocks are exemplary. That is, embodiments are well suited to performing various other blocks or variations of the blocks recited in flowcharts 500-600. It is appreciated that the blocks in flowcharts 500-600 may be performed in an order different than presented, and that not all of the blocks in flowcharts 500-600 may be performed. Flowcharts 500-600 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 5 shows an exemplary flowchart of a computer controlled process for performing deduplication, in accordance with embodiments of the present invention. Process 500 may be performed by a deduplication manager or module (e.g., deduplication manager 112*a-b*).

At block 502, a plurality of files in a primary storage filesystem are accessed (e.g., in an electronics system). Files in a primary storage filesystem may be concurrently available for applications or on an active/live filesystem.

At block 504, a plurality fingerprints for the plurality of files is determined (e.g., by scan engine 208). In one embodiment, each respective fingerprint corresponds to a respective portion of a file of the plurality of files.

At block 506, a plurality of portions of the plurality of files where each of the plurality of portions has the same corresponding fingerprint is determined (e.g., by deduplication engine 216).

At block 508, a list comprising a plurality of portions of files previously deduplicated is optionally accessed. The list may further comprise deleted files and truncated files.

At block 510, the fingerprint for a portion of the file is verified prior to the deduplicating. This may be done because there is time between the determination of the fingerprint and the deduplication.

At block 512, a portion of a file of the plurality of files not present in the list is deduplicated. In one embodiment, deduplicating is performed by via a kernel. As described herein, deduplicating may comprise setting a metadata pointer for a portion of a file that is freed.

At block 514, consecutive portions of variable length of the plurality of files having the same fingerprints may optionally be deduplicated in a single call. As described herein, embodiments of the present invention are operable to deduplicate matching portions of files larger than the fingerprint granularity.

At block 516, the portion of the file of the plurality of files having the same fingerprint is added to the list. As described herein, the location of the file that has been deduplicated is added to the exclusion list.

At block 518, consecutive portions of the plurality of files having the same fingerprint are added to the list. As described herein, a range based on the size of the match is added is added to the exclusion list. In one embodiment, blocks 516 and 518 are combined.

FIG. 6 shows an exemplary flowchart of a computer controlled process for sharing or deduplication, in accordance with an embodiment of the present invention. Process 600 may be performed by a share engine (e.g., share engine 210). In one embodiment, process 600 may be performed with the processing of advisory sets comprising fingerprints and corresponding known and new data locations and known and new data exclusion lists.

At block 602, a first location is accessing from a list of known locations. In one embodiment, the first location is accessed based on inode and logical offset.

At block 604, a determination is made as to whether the data location is in the new data exclusion list. If the first data location is in the new data exclusion list, block 606 is performed. If the data location is not in the new data exclusion list, block 608 is performed.

At block 606, the next entry in the list known locations is accessed. If there is no next entry in the known locations lists, the process may complete. At block 608, a new location is accessed from the list of new data locations.

At block 610, a determination is made if the new data location from the list of new locations is in the new data exclusion list. If the new location is present in the new data exclusion list, block 612 is performed. If the new data location is not present in the new data exclusion list, the deduplication function is invoked (e.g., via an API) for block sharing with the size of the new data location.

At block 612, the next entry in the list new locations is accessed. If there is no next entry in the new data locations list, block 602 is performed.

At block 614, the match is performed. In one embodiment, the match is performed with the size according specified in the advisory set. In one embodiment, the deduplication function of the kernel honors the requested match size first. At block 616, the size of largest possible match or variable length share is determined (e.g., by the kernel). If a match is made, then the deduplication function determines the largest match possible for variable length sharing (e.g., as many fingerprints as possible) allowed by the fingerprint boundaries for either the file or a maximum match size (e.g., 1 MB) is reached. The deduplication function may then return the size of the match. In one embodiment, a call to the deduplication function of the kernel returns a match size to a user space application (e.g., share engine 210).

At block 620, the size of the largest possible match is accessed (e.g., by share engine 210).

At block 622, whether the match was larger than the block size is determined. If the size was larger than the block size, block 624 is performed. If the size was not larger than the block size, block 612 is performed.

At block 624, the additional matched locations are added to the new data exclusion list. For example, if the size of the match is larger than the fingerprint size (e.g., block size or 4K), the share engine adds the next 4K aligned value for the current offset and the range (e.g., returned size, 4K aligned) to the new data exclusion list.

Figure 7:
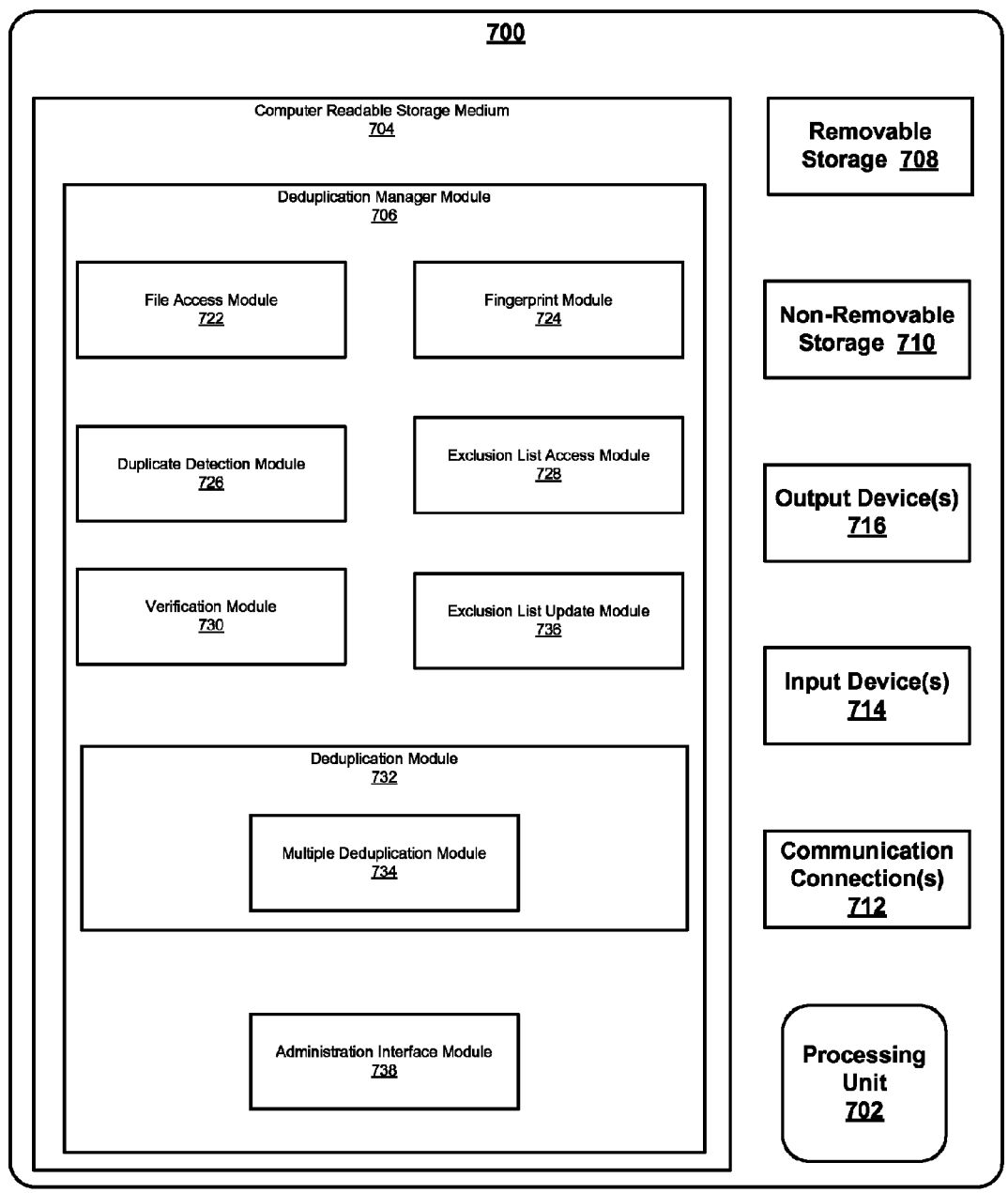
FIG. 7 shows a block diagram of exemplary computer system and corresponding modules, in accordance with one embodiment of the present invention.

FIG. 7 illustrates example components used by various embodiments of the present invention. Although specific components are disclosed in system 700, it should be appreciated that such components are examples. That is, embodiments of the present invention are well suited to having various other components or variations of the components recited in system 700. It is appreciated that the components in system 700 may operate with other components than those presented, and that not all of the components of system 700 may be required to achieve the goals of system 700.

FIG. 7 shows a block diagram of an exemplary computer system and corresponding modules, in accordance with one embodiment of the present invention. With reference to FIG. 7, an exemplary system module for implementing embodiments includes a general purpose computing system environment, such as computing system environment 700. Computing system environment 700 may include, but is not limited to, servers (e.g., servers 106a-b), desktop computers, laptops, tablet PCs, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed perform deduplication (e.g., processes 500-600). In one embodiment, computer readable storage medium 704 is a non-transitory computer readable medium.

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 712 may allow computing system environment 700 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and are not discussed at length.

In one embodiment, computer readable storage medium 704 includes deduplication manager module 706 which includes file access module 722, fingerprint module 724, duplication detection module 726, exclusion list access module 728, verification module 730, exclusion list update module 736, deduplication module 732, and administration interface module 738.

File access module 722 is operable to access files on a primary storage filesystem. Fingerprint module 724 is operable to use file access module 722 to access files and determine fingerprints for portions of the files (e.g., fingerprints for each 4K portion of each file). Duplication detection module 726 is operable determine duplicate portions of files based on fingerprints determined by fingerprint module 724. Exclusion list access module 728 is operable to access an exclusion list comprising portions of files that have already been deduplicated and thereby can be skipped during the processing of the duplicate portions determined by duplication detection module 726. Verification module 730 is operable to verify fingerprints (e.g., to ensure the portions of a file and the corresponding fingerprint have not changed since the fingerprint was determined by fingerprint module 724).

Deduplication module 732 is operable to perform deduplication or sharing operations. Deduplication module 732 may free a portion of storage corresponding to a portion of a file and set the corresponding metadata for the portion of the file to point to a portion of another file. In one embodiment, deduplication module 732 includes multiple deduplication module 734 which is operable to determine and deduplicate successive portions of files having corresponding matching fingerprints.

Exclusion list update module 736 is operable to update the exclusion list based on deduplication performed by deduplication module 732. Exclusion list update module 736 is operable to update the exclusion list for a single portion of a file as well as multiple portions of a plurality of files. Administration interface 738 is operable to facilitate administration of deduplication by embodiments of the present invention (e.g., setting configuration 206, and other interfaces tools such as CLI, etc.)

Figure 8:
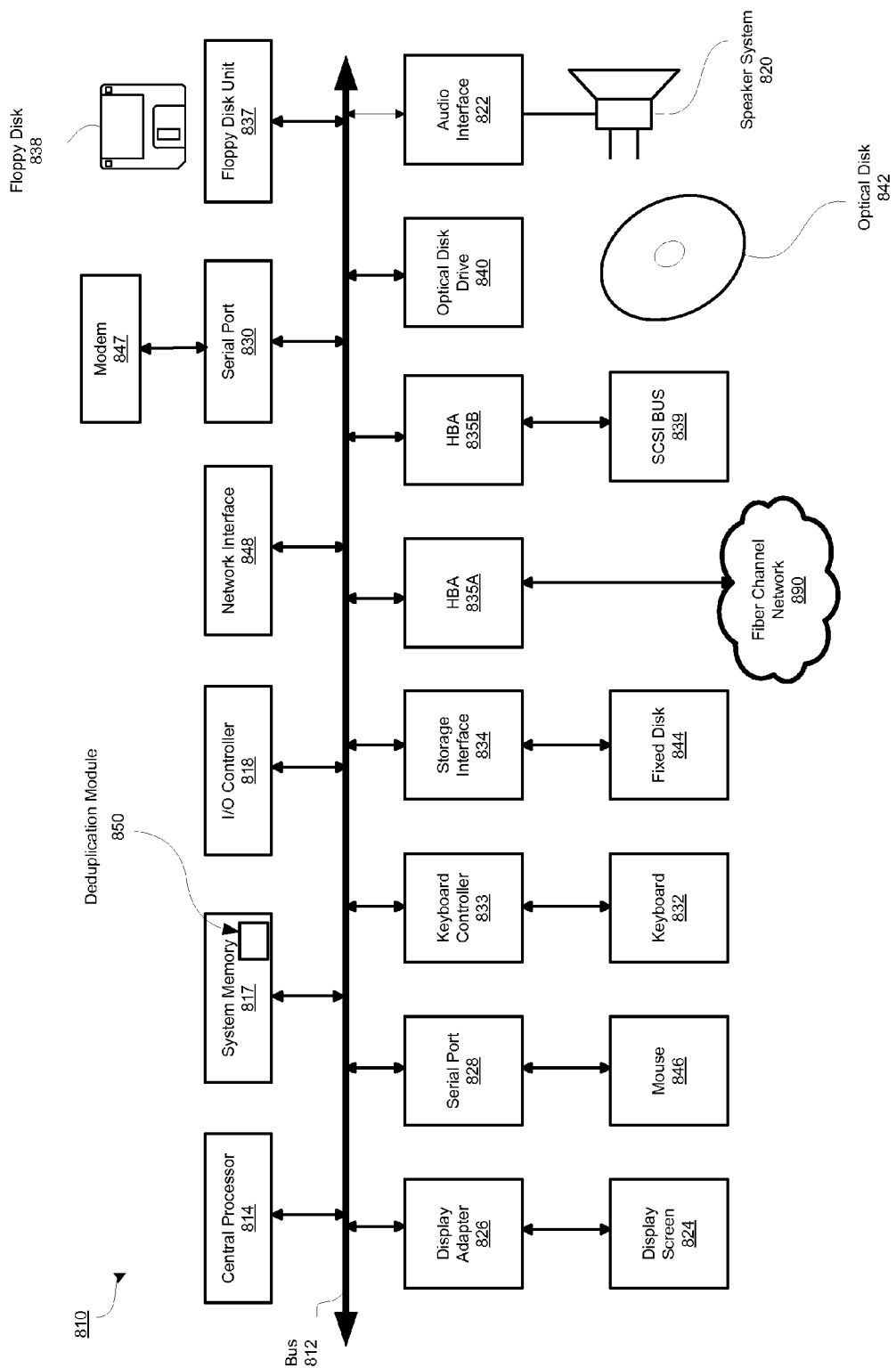
FIG. 8 shows a block diagram of another exemplary computer system, in accordance with one embodiment of the present invention.

FIG. 8 shows a block diagram of another exemplary computer system, in accordance with one embodiment of the present invention. FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812). System memory 817 includes deduplication module 850 which is operable to efficiently deduplicate data thereby saving storage and processing resources.

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Embodiments of the present invention are operable to perform periodic deduplication of a primary storage filesystem with significant resource utilization and storage savings. Embodiments are operable to perform variable length sharing or deduplication thereby deduplicating consecutive portions of files having same content. Variable length sharing further allows embodiments of the present invention to avoid making calls to perform sharing or deduplication operations for portions of a file previously shared as part of a larger share. Embodiments of the present invention are thus operable to perform efficient deduplication and maintain an efficient file geometry (e.g., by deduplicating multiple matching portions of files).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for filesystem deduplication comprising:
accessing, within an electronic system, a plurality of files in a primary storage filesystem;
determining a plurality of fingerprints for said plurality of files, wherein each respective fingerprint corresponds to a respective portion of a respective file of said plurality of files;
matching a first portion of a first file of said plurality of files with a first portion of a second file of said plurality of files, wherein said matched first portions have the same corresponding fingerprint;
determining a largest possible match, wherein said largest possible match comprises said matched first portions and all portions stored consecutive to said matched first portions in said first file and said second file that have the same corresponding fingerprint;
accessing a list comprising a plurality of portions of files previously deduplicated; and
deduplicating a second portion of a said first file not present in said list, wherein said second portion comprises at least said first portion of said first file and all said portions stored consecutive to said first portion in said first file comprising said largest possible match.

2. The method of claim 1 further comprising:
adding said second portion of said first file of said plurality of files to said list.

3. The method of claim 1 further comprising:
adding consecutive portions of said plurality of files having the same fingerprint to said list.

4. The method of claim 1 wherein said deduplicating is performed by via a kernel and said deduplicating a second portion of said first file not present in said list is performed by said kernel.

5. The method of claim 1 wherein said deduplicating further comprises setting a metadata pointer for a portion of a file.

6. The method of claim 1 wherein said list further comprises deleted files.

7. The method of claim 1 wherein said list further comprises truncated files.

8. The method of claim 1 further comprising:
verifying a fingerprint corresponding to said second portion of said first file prior to said deduplicating.

9. A non-transitory computer readable storage medium having stored thereon, computer executable instructions that, if executed by a computer system cause the computer system to perform a method for filesystem deduplication comprising:
accessing, within an electronic system, a plurality of files in a primary storage filesystem;
determining a plurality of fingerprints for said plurality of files, wherein each respective fingerprint corresponds to a respective portion of a respective file of said plurality of files;
matching a first portion of a first file of said plurality of files with a first portion of a second file of said plurality of files, wherein said matched first portions have the same corresponding fingerprint;
determining a largest possible match, wherein said largest possible match comprises said matched first portions and all portions stored consecutive to said matched first portions in said first file and said second file that have the same corresponding fingerprint;
accessing a list comprising a plurality of portions of files previously deduplicated; and
deduplicating a second portion of a said first file not present in said list, wherein said second portion comprises at least said first portion of said first file and all said portions stored consecutive to said first portion in said first file comprising said largest possible match.

10. The non-transitory computer readable storage medium of claim 9, wherein said method further comprises:
adding said second portion of said first file of said plurality of files to said list.

11. The non-transitory computer readable storage medium of claim 9, wherein said method further comprises:
adding consecutive portions of said plurality of files having the same fingerprint to said list.

12. The non-transitory computer readable storage medium of claim 9, wherein said deduplicating is performed by via a kernel and said deduplicating a second portion of said first file not present in said list is performed by said kernel.

13. The non-transitory computer readable storage medium of claim 9, wherein said deduplicating further comprises setting a metadata pointer for a portion of a file.

14. The non-transitory computer readable storage medium of claim 9, wherein said list further comprises deleted files and truncated files.

15. The non-transitory computer readable storage medium of claim 9, wherein said method further comprises:
verifying a fingerprint corresponding to said second portion of said first file prior to said deduplicating.

16. A storage system, comprising:
a computer system comprising one or more processors coupled to a computer readable storage media and configurable to execute computer readable code stored on the computer readable storage media which causes the computer system to implement a method comprising:
accessing, within an electronic system, a plurality of files in a primary storage filesystem;
determining a plurality of fingerprints for said plurality of files, wherein each respective fingerprint corresponds to a respective portion of a respective file of said plurality of files;
matching a first portion of a first file of said plurality of files with a first portion of a second file of said plurality of files, wherein said matched first portions have the same corresponding fingerprint;
determining a largest possible match, wherein said largest possible match comprises said matched first portions and all portions stored consecutive to said matched first portions in said first file and said second file that have the same corresponding fingerprint;
accessing a list comprising a plurality of portions of files previously deduplicated; and
deduplicating a second portion of a said first file not present in said list, wherein said second portion comprises at least said first portion of said first file and all said portions stored consecutive to said first portion in said first file comprising said largest possible match.

17. The storage system of claim 16, wherein said method further comprises:
adding said second portion of said first file of said plurality of files to said list.

18. The storage system of claim 16 wherein said method further comprises:
adding consecutive portions of said plurality of files having the same fingerprint to said list.

19. The storage system of claim 16 wherein said method further comprises:
verifying a fingerprint corresponding to said second portion of said first file prior to said deduplicating.

20. The storage system of claim 18 wherein said deduplicating is performed by via a kernel and said deduplicating a second portion of said first file not present in said list is performed by said kernel.

* * * * *